(12) United States Patent
Schlepple

(10) Patent No.: US 12,717,093 B2
(45) Date of Patent: Aug. 25, 2026

(54) LARGE-NA CONNECTOR FOR CPO APPLICATIONS

(71) Applicant: Cisco Technology, Inc., San Jose, CA (US)

(72) Inventor: Norbert Schlepple, Macungie, PA (US)

(73) Assignee: Cisco Technology, Inc., San Jose, CA (US)

( * ) Notice: Subject to any disclaimer, the term of this patent is extended or adjusted under 35 U.S.C. 154(b) by 285 days.

(21) Appl. No.: 18/356,811

(22) Filed: Jul. 21, 2023

(65) Prior Publication Data

US 2025/0028125 A1 Jan. 23, 2025

(51) Int. Cl.
*G02B 6/32* (2006.01)
*G02B 6/38* (2006.01)

(52) U.S. Cl.
CPC ............. *G02B 6/3853* (2013.01); *G02B 6/32* (2013.01); *G02B 6/3882* (2013.01); *G02B 6/3885* (2013.01)

(58) Field of Classification Search
CPC ...... G02B 6/32; G02B 6/3853; G02B 6/3882; G02B 6/3885
See application file for complete search history.

(56) References Cited

U.S. PATENT DOCUMENTS 8,622,632 B2 * 1/2014 Isenhour .............. G02B 6/4293 385/89
2005/0249459 A1 11/2005 Rosinski et al.
2012/0020619 A1 1/2012 Kadar-Kallen et al.
2016/0246004 A1 8/2016 Kachru et al.
2016/0320569 A1 11/2016 Fortusini et al.
2018/0017738 A1 1/2018 Nakama et al.
2020/0041731 A1 2/2020 Cuno et al.
2020/0310044 A1 10/2020 Sasaki et al.
2022/0050250 A1 2/2022 Asada et al.

FOREIGN PATENT DOCUMENTS

JP S59171919 A 9/1984
JP 2000206359 A 7/2000
JP 2020095183 A * 6/2020

OTHER PUBLICATIONS

Machine translation of Sasaki JP-2020095183-A (Year: 2020).*
Partial European Search Report for European Application No. 24187993.1, dated Dec. 17, 2024, 13 Pages.
European Search Report for European Application No. 24187993.1, dated Mar. 10, 2025, 11 Pages.

* cited by examiner

*Primary Examiner* — Ryan A Lepisto
(74) *Attorney, Agent, or Firm* — Patterson + Sheridan, LLP

(57) ABSTRACT

An optical connector is provided. The optical connector includes an optical fiber and a ferrule mated with the optical fiber. The ferrule has a lens spaced from an end of the optical fiber. The lens is configured to focus an optical signal received from the optical fiber to converge to a beam waist before diverging thereafter.

16 Claims, 8 Drawing Sheets

200
202
250
260
220
228
238
290
284
294
280
282
222
232
$NA_1$
240
$\varpi_2$
$NA_2$
$NA_1$
$\varpi_1$
$\varpi_3$
210
$D_L$
288
270
$f_1$
$f_2$
$f_2$
$f_1$
272
230
292
286

300
302
350
390
360
320
328
338
384
394
380
322
382
332
NA1
NA2
NA2
NA1
ϖ1
ϖ3
310
DL
ϖ2
388
370
f1
f2
f2
f1
372
330
392
386

LARGE-NA CONNECTOR FOR CPO APPLICATIONS

TECHNICAL FIELD

Embodiments presented in this disclosure generally relate to Co-Packaged Optical (CPO) applications, and more specifically, to optical connectors for CPO applications.

BACKGROUND

Design of optical connectors for Co-Packaged Optics (CPO) applications has presented certain challenges. For instance, Mechanical Transferrable (MT) optical connectors can provide relatively beneficial angle alignment tolerance and eye safety. However, MT optical connectors can be sensitive to lateral offsets and dust. Moreover, MT optical connectors can be less than ideal for power handling and can require a relatively high mating force. Expanded Beam Optics (EBO) optical connectors can be more resilient to lateral offsets and dust, while also offering improved power handling and low mating force requirements. However, EBO optical connectors can provide less than ideal angle alignment tolerance and eye safety. Eye safety for EBO optical connectors is a concern namely due to the collimated beam aspect provided by such EBO connectors. Thus, there are certain challenges associated with such conventional optical connectors.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
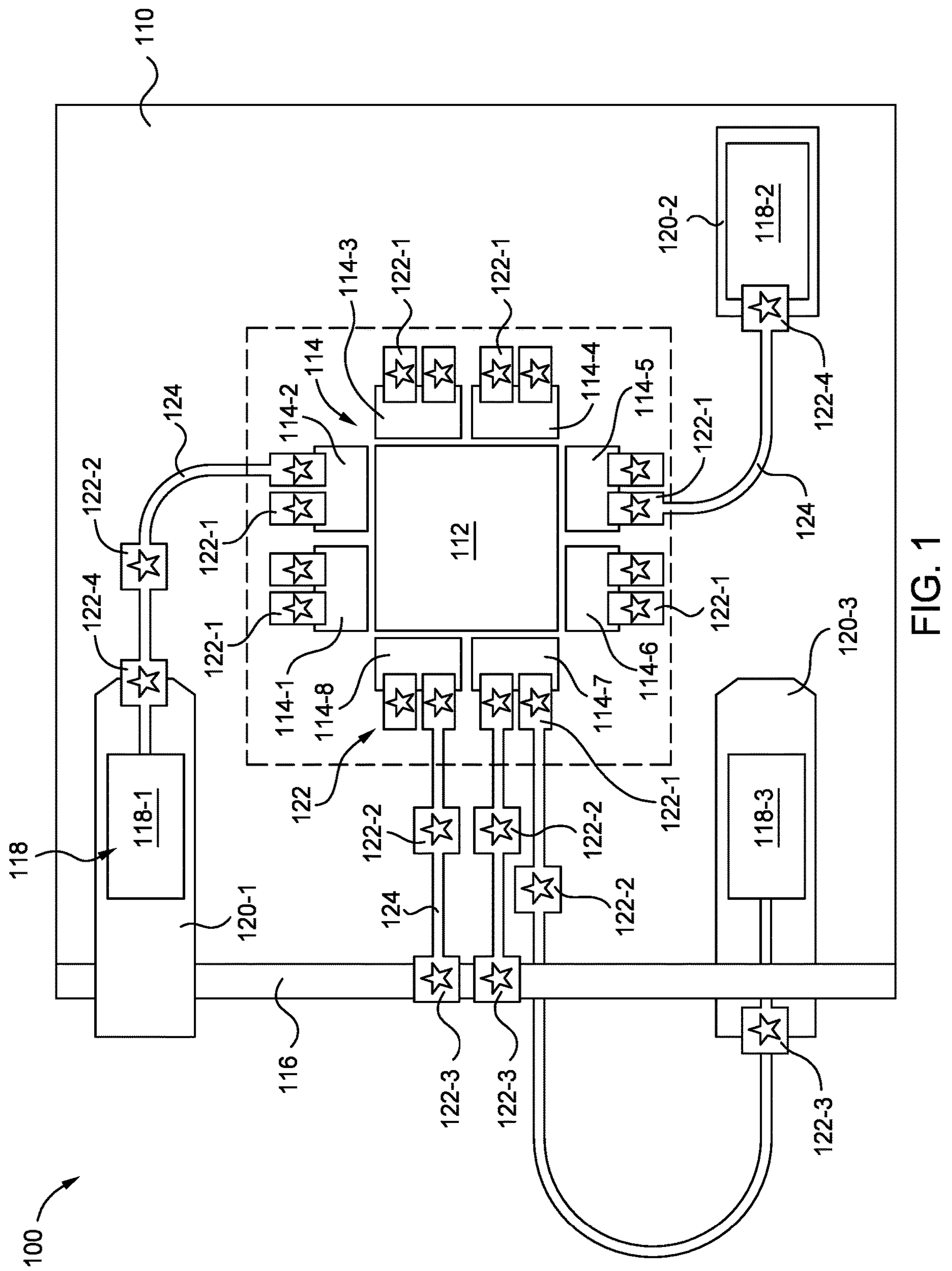
FIG. 1 is a schematic view of an opto-electronic apparatus according to one or more embodiments.

Generally, optical connectors and optical systems for Co-Packaged Optics (CPOs) applications are provided in this disclosure.

One embodiment presented in this disclosure is an optical connector. The optical connector includes an optical fiber and a ferrule mated with the optical fiber. The ferrule has a lens spaced from an end of the optical fiber. The lens is configured to focus an optical signal received from the optical fiber to converge to a beam waist before diverging thereafter. That is, a curvature of the lens is arranged to purposefully cause an optical signal received from an optical fiber to converge to a beam waist.

Another embodiment presented in this disclosure is an optical connector. The optical connector includes a ferrule that has a first lens spaced from, and aligned with, a first optical fiber mated with the ferrule. The ferrule also has a second lens spaced from, and aligned with, a second optical fiber mated with the ferrule. The first lens has a different radius of curvature than the second lens.

A further embodiment presented in this disclosure is an optical system. The optical system includes an optical connector having an optical fiber and a ferrule mated with the optical fiber. The ferrule has a lens spaced from an end of the optical fiber. The lens is configured to focus an optical signal received from the optical fiber to converge to a second beam waist. The optical signal has a first beam waist at or immediately adjacent to the optical fiber. The second beam waist is less than a beam diameter of the optical signal at the lens and is equal to or less than four times the first beam waist.

In some further embodiments, the optical system includes a second optical connector removably coupled with the optical connector. The second optical connector has a second optical fiber and a second ferrule mated with the second optical fiber. The second ferrule has a second lens spaced from an end of the second optical fiber. The second lens is configured to focus the optical signal, which has diverged after the second beam waist, to converge to a third beam waist prior to being received by the second optical fiber.

In some additional embodiments, the optical system includes a photonics integrated circuit having an optical coupler. The ferrule of the optical coupler is removably coupled with the photonics integrated circuit. The lens is configured to focus the optical signal from the optical fiber to converge to the second beam waist at or immediately adjacent the optical coupler.

Yet another embodiment presented in this disclosure is an optical connector. The optical connector includes an optical fiber and a ferrule mated with the optical fiber. The ferrule has a lens spaced from an end of the optical fiber. The lens is configured to change a numerical aperture of an optical signal. Particularly, the numerical aperture of the optical signal can match a numerical aperture of the optical fiber (e.g., for optimum coupling) prior to passing through the lens. The optical fiber can be a single mode fiber, for example. The lens changes the numerical aperture of the optical signal so that the numerical aperture of the optical signal is larger or smaller than the numerical aperture of the optical fiber. In some embodiments, the lens can be configured to focus the optical signal so that the numerical aperture of the optical signal is the same as the numerical aperture of the optical fiber.

EXAMPLE EMBODIMENTS

Provided herein are various embodiments of optical connectors (and optical systems that include such optical connectors) that address the challenges associated with conventional optical connectors. For instance, the optical connectors of this disclosure can provide beneficial angle alignment tolerance, dust resilience, power handling, eye safety, and low mating force requirements. In this regard, the advantages and/or benefits of conventional optical connectors are combined in the optical connectors of this disclosure.

Optical connectors of this disclosure can beneficially have enhanced eye safety from a diverging beam similar to Mechanically Transferrable (MT) optical connectors. Optical connectors of this disclosure can beneficially have stable coupling efficiency with a tolerance model similar to MT optical connectors. Optical connectors of this disclosure can beneficially have high optical power handling similar to Expanded Beam Optics (EBO) optical connectors. Optical connectors of this disclosure can beneficially have low mating force requirements similar to EBO optical connectors. Further, optical connectors of this disclosure can beneficially have low dust/contamination susceptibility similar to EBO optical connectors. In this regard, use of the optical connectors described herein solves the technical challenges associated with conventional optical connectors. Example embodiments of optical connectors and optical systems including such optical connectors that can achieve one or more of the noted benefits and/or advantages are provided below.

FIG. 1 is a schematic view of an opto-electronic apparatus 100 according to one or more embodiments. In FIG. 1, the opto-electronic apparatus 100 is configured as a CPO system. As shown, the opto-electronic apparatus 100 includes, among other components, a substrate 110, an electronic integrated circuit (IC) 112, and one or more optical engines 114-1 through 114-8 (generically or collectively, optical engine(s) 114). The electronic IC 112 is centrally located on the substrate 110 and the optical engines 114 are arranged laterally outward from the electronic IC 112. Other arrangements of the electronic IC 112 and the optical engines 114 are also contemplated. The electronic IC 112 and the optical engines 114 can have any suitable functionality. The electronic IC 112 can be a Network Processor Unit (NPU), for example. The optical engines 114 can be configured for realizing photoelectric signal conversion. A faceplate 116 is coupled with the substrate 110. The faceplate 116 can provide a pluggable interface with the opto-electronic apparatus 100.

In some embodiments, the substrate 110 conductively couples the electronic IC 112 and the optical engines 114. Particularly, the substrate 110 can include one or more layers, such as conductive layer(s), semiconductor layer(s), and/or insulator layer(s). The substrate 110 can further include one or more conductive vias extending between layers, and/or extending to a top surface and/or a bottom surface of the substrate 110. For instance, the substrate 110 can include first conductive connections on a top surface of the substrate 110, second conductive connections on a bottom surface of the substrate 110, and conductive vias connecting the first and second conductive connections. In this way, the electronic IC 112 and the optical engines 114 can be mounted on the top surface and connected through the substrate 110 to a printed circuit board (PCB) or other device connected to the bottom surface.

In addition, the opto-electronic apparatus 100 includes one or more light sources. For the depicted embodiment of FIG. 1, the opto-electronic apparatus 100 includes a plurality of remote light sources (RLS) 118-1, 118-2, 118-3 (generically or collectively, RLS(s) 118). In some embodiments, the RLS 118 can be lasers and can be either single- or multi-wavelength light sources. RLS 118-1, 118-2, 118-3 are disposed within respective light source enclosures 120-1, 120-2, 120-3.

The opto-electronic apparatus 100 further includes one or more optical connectors and one or more optical fibers. For the illustrated embodiment of FIG. 1, the opto-electronic apparatus 100 includes a plurality of optical connectors (generically or collectively, optical connector(s) 122) and a plurality of optical fibers (generically or collectively, optical fiber(s) 124). The optical connectors 122 include a set of optical engine connectors 122-1 (not all of which are labeled) each configured to optically couple with one of the optical engines 114, a set of mid-board optical connectors 122-2 that optically couple one optical fiber with another, a set of faceplate optical connectors 122-3 that each offer optical coupling at the faceplate 116, and a set of RLS optical connectors 122-4 each configured to optically couple with one of the RLS 118. The optical fibers 124 (not all of which are labeled in FIG. 1) can carry optical signals, e.g., from one of the RLS 118 to a Photonics Integrated Circuit (PIC) of one of the optical engines 114.

Figures 2A, 2B:
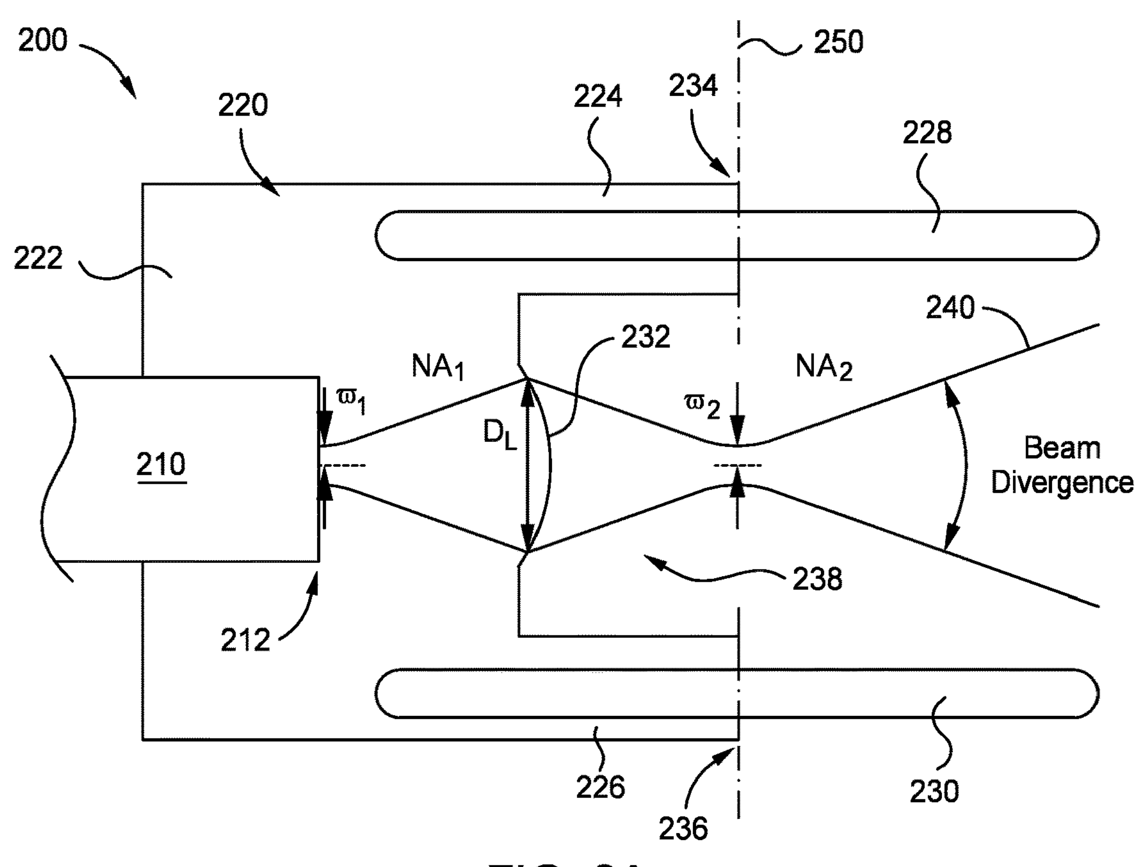
FIG. 2A is a schematic view of an optical connector according to one or more embodiments.
FIG. 2B is a schematic view of the optical connector of FIG. 2A coupled with another optical connector.

FIG. 2A is a schematic view of an optical connector 200 according to one or more embodiments. The optical connector 200 can be incorporated into an opto-electronic apparatus, such as the opto-electronic apparatus 100 of FIG. 1. For instance, any of the optical connectors 122 of FIG. 1 can be configured in a same or similar manner as the optical connector 200 of FIG. 2A. The optical connector 200 can be removably coupled with, e.g., another optical connector, a PIC of an optical engine, etc.

As shown in FIG. 2A, the optical connector 200 includes an optical fiber 210 and a ferrule 220 mated with the optical fiber 210. The optical fiber 210 can be a Single Mode Fiber (SMF) or a Polarization-Maintaining Fiber (PMF), for example. The ferrule 220 can be formed of a transparent or semi-transparent material, e.g., to allow optical signals to traverse therethrough. The ferrule 220 has a body 222 and a pair of opposing guide prongs 224, 226 extending from the body 222. The guide prongs 224, 226 each receive respective guide pins 228, 230. The ferrule 220 has a lens 232 spaced from an end 212 of the optical fiber 210. The lens 232 is recessed relative to ends 234, 236 of the guide prongs 224, 226. The lens 232 and the body 222 of the ferrule 220 define a volume 238, e.g., through which optical signals traverse. The volume 238 can be a fluid volume, such as an air volume or a liquid volume.

Notably, the lens 232 is configured to focus an optical signal received from the optical fiber 210 to converge to a beam waist before diverging thereafter. That is, the lens 232 is arranged to purposefully cause an optical signal received from the optical fiber 210 to converge to a beam waist so that the optical signal diverges thereafter, e.g., for improved eye safety. A beam waist is defined at a location where the beam of an optical signal is at its narrowest spot or minimal beam radius. Particularly, as depicted in FIG. 2A, an optical signal 240 is shown propagating from the optical fiber 210. In FIG. 2A, the optical signal 240 is represented schematically by its Numerical Aperture (NA), which is a dimensionless number that characterizes the sine of the largest angle of the optical signal 240 at a given point of traversal through or emitted from the optical connector 200.

The optical signal 240 has a first beam waist $\omega_1$ at or immediately adjacent the optical fiber 210. Due to the spacing between the lens 232 and the end 212 of the optical fiber 210, the optical signal 240 diverges as it propagates from the first beam waist $\omega_1$ to the lens 232. In this regard, the ferrule 220 is arranged so that the optical signal 240 propagating from the optical fiber 210 diverges prior to passing through the lens 232. In diverging from the optical fiber 210 to the lens 232, the optical signal 240 has a first numerical aperture $NA_1$.

At the lens 232, the optical signal 240 has a beam diameter $D_L$. The beam diameter $D_L$ at the lens 232 is greater than a diameter of the optical signal 240 at the first beam waist $\omega_1$. As shown in FIG. 2A, the lens 232 focuses the optical signal 240, which diverges just prior to reaching the lens 232, to converge to a second beam waist $\omega_2$. Specifically, the lens 232 focuses the optical signal 240 received from the optical fiber 210 so that the optical signal 240 converges as the optical signal 240 traverses through the volume 238. The optical signal 240 eventually converges to the second beam waist $d_2$.

After the optical signal 240 converges to the second beam waist $\omega_2$, importantly, the optical signal 240 diverges thereafter. That is, the light rays of the optical signal 240 "crisscross" at the second beam waist $\omega_2$. The beam divergence of the optical signal 240 can be approximately ten degrees (10°), for example. In converging from the lens 232 to the second beam waist $\omega_2$ and diverging thereafter, the optical signal 240 has a second numerical aperture $NA_2$.

In some embodiments, the second beam waist $\omega_2$ to which the optical signal 240 converges and then diverges thereafter is aligned in a same plane 250 as the ends 234, 236 of the guide prongs 224, 226, e.g., as depicted in FIG. 2A. This allows an optical connector coupled with the optical connector 200 to be similarly configured, e.g., without or with a reduced need to change a curvature of the lenses of the optical connectors and/or other characteristics thereof. This can simplify fabrication of connectable optical connectors, assembly of an opto-electronic apparatus utilizing such optical connectors, maintenance and/or repair of such opto-electronic apparatuses, and/or stocking of parts, among other benefits.

The arrangement of the optical connector 200 of FIG. 2A can provide certain advantages and benefits. Specifically, the optical connector 200 can advantageously combine the benefits of both Mechanically Transferrable (MT) and Expanded Beam Optics (EBO) connectors, while mitigating the cons. As one advantage, the optical connector 200 can provide enhanced laser eye safety due to the lens 232 focusing the optical signal 240 to converge to a beam waist before diverging thereafter, which can provide sufficient beam divergence at eye level. Conventional EBO connectors, which have lenses configured to focus collimated beams, may not provide such an advantage. Moreover, as another advantage, the optical connector 200 can provide stable coupling efficiency with a tolerance model. As yet another advantage, the optical connector 200 can provide high optical power handling. As a further advantage, the optical connector 200 can facilitate relatively low mating force requirements and relatively low dust/contamination susceptibility.

Further, in some embodiments, as shown FIG. 2A, the optical connector 200 is arranged so that the first beam waist $\omega_1$ is equal to the second beam waist $\omega_2$, or stated mathematically, so that $\omega_1=\omega_2$. Stated another way, the optical connector 200 is arranged so that the second numerical aperture $NA_2$ of the optical signal 440 as it converges after passing through the lens 432 and diverges after converging to the second beam waist $\omega_2$ is equal to the first numerical aperture $NA_1$ of the optical signal 440 as it diverges prior to the lens 432, or stated mathematically, so that $NA_2=NA_1$. In such embodiments, advantageously, a balance can be struck between a mechanical alignment tolerance (resulting in an Insertion Loss (IL) penalty) and eye safety (far field NA). Particularly, in such embodiments, the optical connector 200 can mimic both the coupling and eye safety performance of a conventional MT connector whilst adding the benefits, such as power handling, dust resilience, and mating force requirements, of a conventional EBO connector.

FIG. 2B is a schematic view of the optical connector 200 of FIG. 2A coupled with another optical connector. Particularly, as depicted in FIG. 2B, the optical connector 200, or first optical connector in this example embodiment, can be coupled mechanically and optically with another optical connector, or a second optical connector 260, to form an optical system 202.

The second optical connector 260 is configured in a same or similar manner as the optical connector 200. As depicted in FIG. 2B, the second optical connector 260 includes an optical fiber 270 and a ferrule 280 mated with the optical fiber 270. The optical fiber 270 can be a SMF or a PMF, for example. The ferrule 280 can be formed of a transparent or semi-transparent material, e.g., to allow optical signals to traverse therethrough. The ferrule 280 has a body 282 and a pair of opposing guide prongs 284, 286 extending from the body 282. The guide prongs 284, 286 each receive respective guide pins 228, 230. For instance, the second optical connector 260 can define respective blind openings or slots that receive the guide pins 228, 230 held or supported by the optical connector 200. Alternatively, the guide pins 228, 230 can be held or supported by the second optical connector 260 and received by blind openings or slots defined by the optical connector 200. The ferrule 280 has a lens 288 spaced from an end 272 of the optical fiber 270. For the depicted embodiment of FIG. 2B, the lens 232 of the optical connector 200 and the lens 288 of the second optical connector 260 have a same radius of curvature. The lens 288 is recessed relative to ends 290, 292 of the guide prongs 284, 286. The lens 288 and the body 282 of the ferrule 280 define a volume 294, e.g., through which optical signals traverse. The volume 294 can be a fluid volume, such as an air volume or a liquid volume.

When the optical connector 200 is coupled with the second optical connector 260 as shown in FIG. 2B, the volume 294 and the volume 238 collectively form an interior volume of the optical system 202 through which optical signals, such as the optical signal 240, can traverse from one connector to the other. As shown in FIG. 2B, the optical signal 240 has an hourglass shape (as outlined by the NA of the optical signal 240) as it traverses through the interior volume.

As further depicted in FIG. 2B, the lens 288 is configured to focus the optical signal 240, which has diverged after the second beam waist $\omega_2$, to converge to a third beam waist $\omega_3$ prior to propagating into the optical fiber 270. In this way, the lens 232 is configured to focus the optical signal 240 to the second beam waist $\omega_2$ before the optical signal 240 is received by a different optical connector, e.g., the second optical connector 260, coupled with the optical connector 200. In this example embodiment, in converging from the lens 288 to the third beam waist $\omega_3$, the optical signal 240 reverts to the first numerical aperture $NA_1$. Further, in this example embodiment, the first beam waist $\omega_1$ and the third beam waist $\omega_3$ are equal or substantially equal to one another (e.g., within five percent (5%) of one another). As the first beam waist $\omega_1$ and the second beam waist $\omega_2$ are also equal to one another in this example embodiment, the second beam waist $\omega_2$ and the third beam waist $\omega_3$ are also equal. As used herein, the term "substantially" means within five percent (5%) of a stated value.

Figures 3A, 3B:
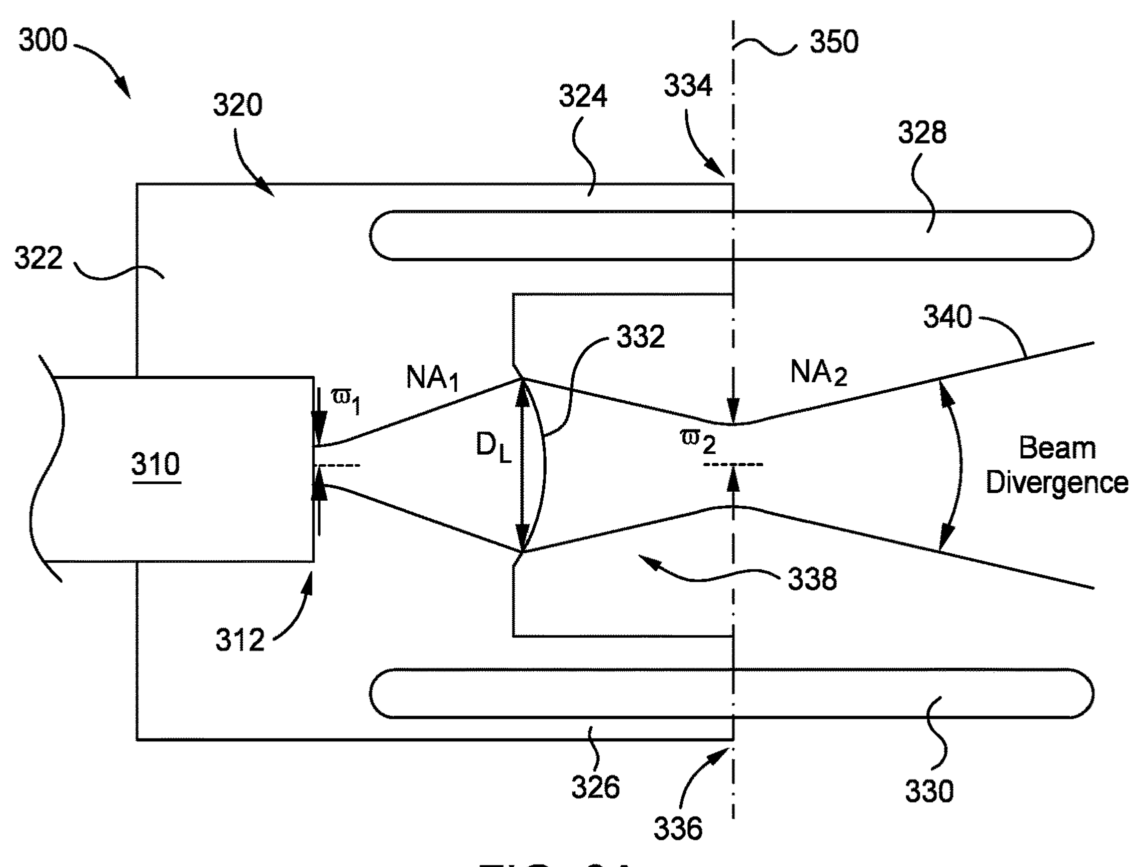
FIG. 3A is a schematic view of an optical connector according to one or more embodiments.
FIG. 3B is a schematic view of the optical connector of FIG. 3A coupled with another optical connector.

FIG. 3A is a schematic view of an optical connector 300 according to one or more embodiments. The optical connector 300 can be incorporated into an opto-electronic apparatus, such as the opto-electronic apparatus 100 of FIG. 1. For instance, any of the optical connectors 122 of FIG. 1 can be configured in a same or similar manner as the optical connector 300 of FIG. 3A. The optical connector 300 can be removably coupled with, e.g., another optical connector, a PIC of an optical engine, etc.

Moreover, the optical connector 300 of FIG. 3A is configured in a similar manner as the optical connector 200 of FIGS. 2A and 2B, except as otherwise noted. As illustrated in FIG. 3A, the optical connector 300 includes an optical fiber 310 and a ferrule 320 mated with the optical fiber 310. The optical fiber 310 can be a SMF or a PMF, for example. The ferrule 320 can be formed of a transparent or semi-transparent material, e.g., to allow optical signals to traverse therethrough. The ferrule 320 has a body 322 and a pair of opposing guide prongs 324, 326 extending from the body 322. The guide prongs 324, 326 each receive respective guide pins 328, 330. The ferrule 320 has a lens 332 spaced from an end 312 of the optical fiber 310. The lens 332 is recessed relative to ends 334, 336 of the guide prongs 324, 326. The lens 332 and the body 322 of the ferrule 320 define a volume 338, e.g., through which optical signals traverse. The lens 332 is configured to focus an optical signal 340 received from the optical fiber 310 to converge to a beam waist, e.g., a second beam waist $\omega_2$, before diverging thereafter. In FIG. 3A, the lens 332 is configured to focus the optical signal 340 so that the second beam waist $\omega_2$ is aligned in a same plane 350 as the ends 334, 336 of the guide prongs 324, 326.

Notably, in the depicted embodiment of FIG. 3A, the optical connector 300 is arranged so that the second beam waist $\omega_2$ is greater than the first beam waist $\omega_1$ and less than the beam diameter $D_L$ of the optical signal 340 at the lens 332, or stated mathematically, so that $D_L>\omega_2>\omega_1$. Stated another way, the optical connector 400 is arranged so that the second numerical aperture $NA_2$ of the optical signal 440 as it converges after passing through the lens 432 is less than the first numerical aperture $NA_1$ of the optical signal 440 as it diverges prior to the lens 432, or stated mathematically, so that $NA_2<NA_1$.

In some particular embodiments, the optical connector 300 is arranged so that the beam diameter $D_L$ of the optical signal 340 at the lens 332 is greater than the second beam waist $\omega_2$, and so that the second beam waist $\omega_2$ is greater than the first beam waist $\omega_1$ but equal to or less than four times the first beam waist $\omega_1$, or stated mathematically, so that so that $D_L>\omega_2$ and $\omega_1<\omega_2\leq 4*\omega_1$. In yet other particular embodiments, the optical connector 300 is arranged so that the beam diameter $D_L$ of the optical signal 340 at the lens 332 is greater than the second beam waist $\omega_2$, and so that the second beam waist $\omega_2$ is greater than the first beam waist $\omega_1$ but equal to or less than two times the first beam waist $\omega_1$, or stated mathematically, so that so that $D_L>\omega_2$ and $\omega_1<(\omega_2\leq 2*\omega_1$. In some further particular embodiments, the optical connector 300 is arranged so that the beam diameter $D_L$ of the optical signal 340 at the lens 332 is greater than the second beam waist $\omega_2$, and so that the second beam waist $\omega_2$ is between two and four times the first beam waist $\omega_1$, including the end points, or stated mathematically, so that so that $D_L>\omega_2$ and $\omega_2$ is between $2*\omega_1$ and $4*\omega_1$, including the end points. In yet further particular embodiments, the optical connector 300 is arranged so that a beam radius of the optical signal 340 at the second beam waist $\omega_2$ is five to ten times smaller than the beam diameter $D_L$ of the optical signal 340 at the lens 332.

In such embodiments, advantageously, the optical connector 300 is less sensitive to lateral offsets compared to the optical connector 200 of FIGS. 2A and 2B, which results in a lower insertion loss penalty. However, the beam divergence of the optical signal 340 after the second beam waist $\omega_2$ as provided by the optical connector 300 of FIG. 3A is less than the beam divergence of the optical signal 240 after the second beam waist $\omega_2$ as provided by the optical connector 200 of FIGS. 2A and 2B. The beam divergence of the optical signal 340 can be less than ten degrees (10°), for example.

FIG. 3B is a schematic view of the optical connector 300 of FIG. 3A coupled with another optical connector. Specifically, as depicted in FIG. 3B, the optical connector 300, or first optical connector in this example embodiment, can be coupled mechanically and optically with another optical connector, or a second optical connector 360, to form an optical system 302.

The second optical connector 360 is configured in a same or similar manner as the optical connector 300. As depicted in FIG. 3B, the second optical connector 360 includes an optical fiber 370 and a ferrule 380 mated with the optical fiber 370. The optical fiber 370 can be a SMF or a PMF, for example. The ferrule 380 can be formed of a transparent or semi-transparent material, e.g., to allow optical signals to traverse therethrough. The ferrule 380 has a body 382 and a pair of opposing guide prongs 384, 386 extending from the body 382. The guide prongs 384, 386 each receive respective guide pins 328, 330. For instance, the second optical connector 360 can define respective blind openings or slots that receive the guide pins 328, 330 held or supported by the optical connector 300. Alternatively, the guide pins 328, 330 can be held or supported by the second optical connector 360 and received by blind openings or slots defined by the optical connector 300. The ferrule 380 has a lens 388 spaced from an end 372 of the optical fiber 370. For the depicted embodiment of FIG. 3B, the lens 332 of the optical connector 300 and the lens 388 of the second optical connector 360 have a same radius of curvature. The lens 388 is recessed relative to ends 390, 392 of the guide prongs 384, 386. The lens 388 and the body 382 of the ferrule 380 define a volume 394, e.g., through which optical signals traverse.

When the optical connector 300 is coupled with the second optical connector 360 as shown in FIG. 3B, the volume 394 and the volume 338 collectively form an interior volume of the optical system 302 through which optical signals, such as the optical signal 340, can traverse from one connector to the other. As depicted in FIG. 3B, the optical signal 340 has an hourglass shape (as outlined by the NA of the optical signal 340) as it traverses through the interior volume.

As further illustrated in FIG. 3B, the lens 388 is configured to focus the optical signal 340, which has diverged after the second beam waist $\omega_2$, to converge to a third beam waist $\omega_3$ prior to propagating into the optical fiber 370. In this way, the lens 332 is configured to focus the optical signal 340 to the second beam waist $\omega_2$ before the optical signal 340 is received by a different optical connector, e.g., the second optical connector 360, coupled with the optical connector 300. In this example embodiment, in converging from the lens 388 to the third beam waist $\omega_3$, the optical signal 340 reverts to the first numerical aperture $NA_1$. Further, in this example embodiment, the first beam waist $\omega_1$ and the third beam waist $\omega_3$ are equal or substantially equal to one another (e.g., within five percent (5%) of one another). Both the first and third beam waists $\omega_1$, $\omega_2$ are smaller than the second beam waist $\omega_2$.

Figure 4A:
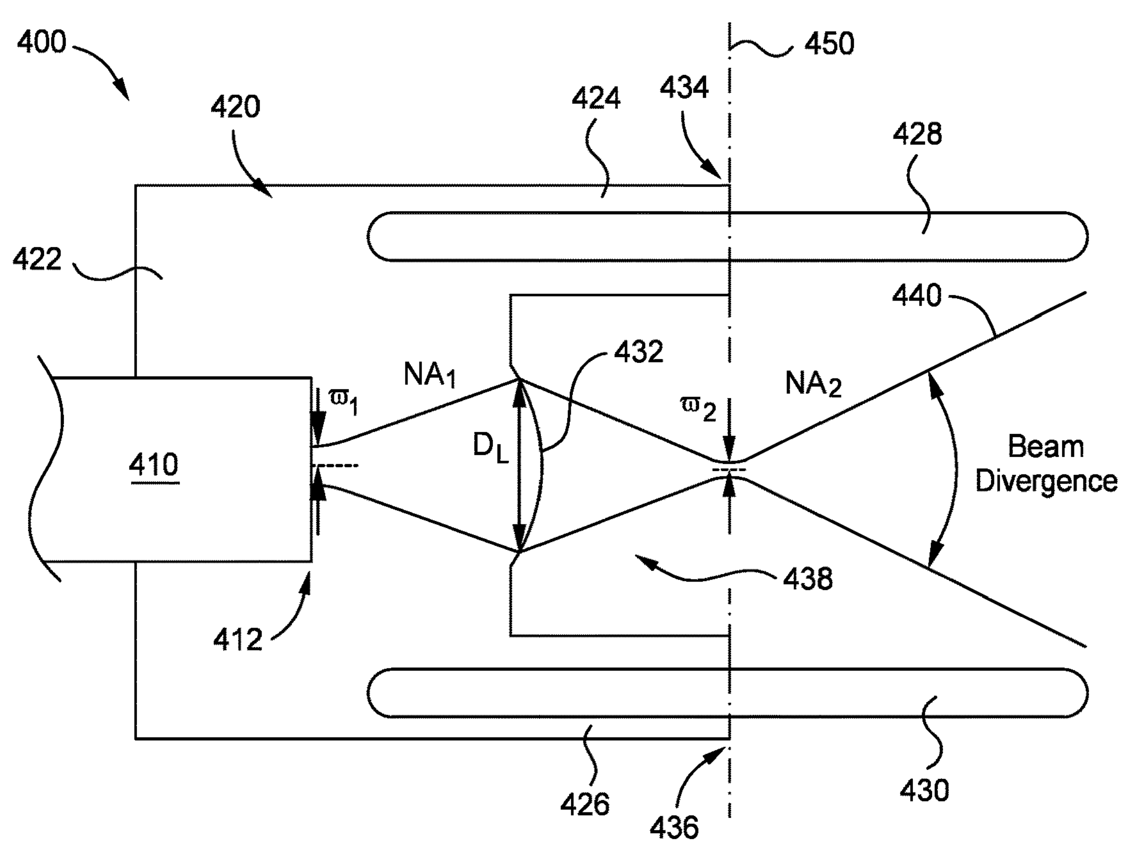
FIG. 4A is a schematic view of an optical connector according to one or more embodiments.

FIG. 4A is a schematic view of an optical connector 400 according to one or more embodiments. The optical connector 400 can be incorporated into an opto-electronic apparatus, such as the opto-electronic apparatus 100 of FIG. 1. For instance, any of the optical connectors 122 of FIG. 1 can be configured in a same or similar manner as the optical connector 400 of FIG. 4A. The optical connector 400 can be removably coupled with, e.g., another optical connector, a PIC of an optical engine, etc.

Moreover, the optical connector 400 of FIG. 4A is configured in a similar manner as the optical connector 200 of FIGS. 2A and 2B, except as otherwise noted. As shown in FIG. 4A, the optical connector 400 includes an optical fiber 410 and a ferrule 420 mated with the optical fiber 410. The optical fiber 410 can be a SMF or a PMF, for example. The ferrule 420 can be formed of a transparent or semi-transparent material, e.g., to allow optical signals to traverse therethrough. The ferrule 420 has a body 422 and a pair of opposing guide prongs 424, 426 extending from the body 422. The guide prongs 424, 426 each receive respective guide pins 428, 430. The ferrule 420 has a lens 432 spaced from an end 412 of the optical fiber 410. The lens 432 is recessed relative to ends 434, 436 of the guide prongs 424, 426. The lens 432 and the body 422 of the ferrule 420 define a volume 438, e.g., through which optical signals traverse. The lens 432 is configured to focus an optical signal 440 received from the optical fiber 410 to converge to a beam waist, e.g., a second beam waist $\omega_2$, before diverging thereafter. In FIG. 4A, the lens 432 is configured to focus the optical signal 440 so that the second beam waist $\omega_2$ is aligned in a same plane 450 as the ends 434, 436 of the guide prongs 424, 426.

Notably, in the depicted embodiment of FIG. 4A, the optical connector 400 is arranged so that the second beam waist $\omega_2$ is less than the first beam waist $\omega_1$, or stated mathematically, so that $\omega_2<\omega_1$. Stated another way, the optical connector 400 is arranged so that the second numerical aperture $NA_2$ of the optical signal 440 as it converges after passing through the lens 432 is greater than the first numerical aperture $NA_1$ of the optical signal 440 as it diverges prior to the lens 432, or stated mathematically, so that $NA_2>NA_1$. In such embodiments, advantageously, the optical connector 400 can offer increased eye safety due to the larger NA or beam divergence of the optical signal 440 after converging to the second beam waist $\omega_2$ compared to the optical connector 200 of FIGS. 2A and 2B. The beam divergence of the optical signal 440 can be greater than ten degrees (10°), for example. However, the optical connector 400 can be more sensitive to lateral offsets compared to the optical connector 200 of FIGS. 2A and 2B, which potentially results in a higher insertion loss penalty.

Figure 4B:
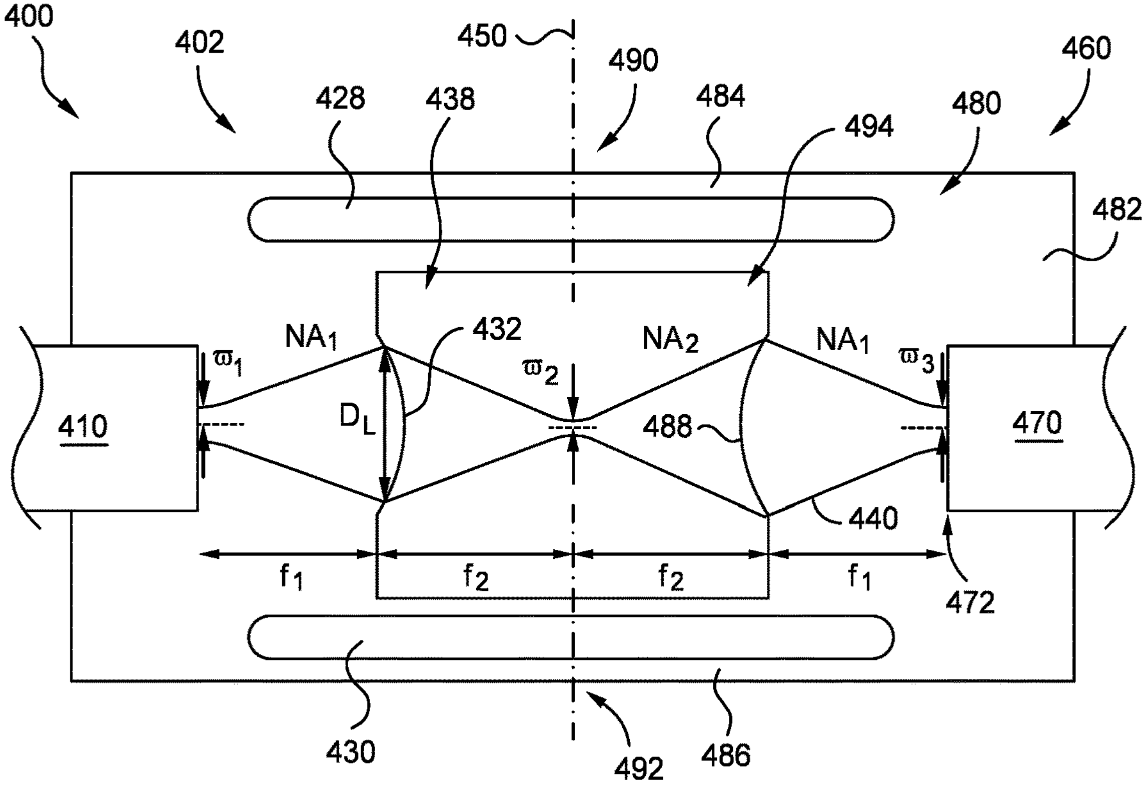
FIG. 4B is a schematic view of the optical connector of FIG. 4A coupled with another optical connector.

FIG. 4B is a schematic view of the optical connector 400 of FIG. 4A coupled with another optical connector. Specifically, as depicted in FIG. 4B, the optical connector 400, or first optical connector in this example embodiment, can be coupled mechanically and optically with another optical connector, or a second optical connector 460, to form an optical system 402.

The second optical connector 460 is configured in a same or similar manner as the optical connector 400. As depicted in FIG. 4B, the second optical connector 460 includes an optical fiber 470 and a ferrule 480 mated with the optical fiber 470. The optical fiber 470 can be a SMF or a PMF, for example. The ferrule 480 can be formed of a transparent or semi-transparent material, e.g., to allow optical signals to traverse therethrough. The ferrule 480 has a body 482 and a pair of opposing guide prongs 484, 486 extending from the body 482. The guide prongs 484, 486 each receive respective guide pins 428, 430. For instance, the second optical connector 460 can define respective blind openings or slots that receive the guide pins 428, 430 held or supported by the optical connector 400. Alternatively, the guide pins 428, 430 can be held or supported by the second optical connector 460 and received by blind openings or slots defined by the optical connector 400. The ferrule 480 has a lens 488 spaced from an end 472 of the optical fiber 470. For the depicted embodiment of FIG. 4B, the lens 432 of the optical connector 400 and the lens 488 of the second optical connector 460 have a same radius of curvature. The lens 488 is recessed relative to ends 490, 492 of the guide prongs 484, 486. The lens 488 and the body 482 of the ferrule 480 define a volume 494, e.g., through which optical signals traverse.

When the optical connector 400 is coupled with the second optical connector 460 as shown in FIG. 4B, the volume 494 and the volume 438 collectively form an interior volume of the optical system 402 through which optical signals, such as the optical signal 440, can traverse from one connector to the other. As depicted in FIG. 4B, the optical signal 440 has an hourglass shape (as outlined by the NA of the optical signal 440) as it traverses through the interior volume.

As further illustrated in FIG. 4B, the lens 488 is configured to focus the optical signal 440, which has diverged after the second beam waist $\omega_2$, to converge to a third beam waist $\omega_3$ prior to propagating into the optical fiber 470. In this way, the lens 432 is configured to focus the optical signal 440 to the second beam waist $\omega_2$ before the optical signal 440 is received by a different optical connector, e.g., the second optical connector 460, coupled with the optical connector 400. In this example embodiment, in converging from the lens 488 to the third beam waist $\omega_3$, the optical signal 440 reverts to the first numerical aperture $NA_1$. Further, in this example embodiment, the first beam waist $\omega_1$ and the third beam waist $\omega_3$ are equal or substantially equal to one another (e.g., within five percent (5%) of one another). Both the first and third beam waists $d_1$, $d_2$ are larger than the second beam waist $\omega_2$.

Figure 5:
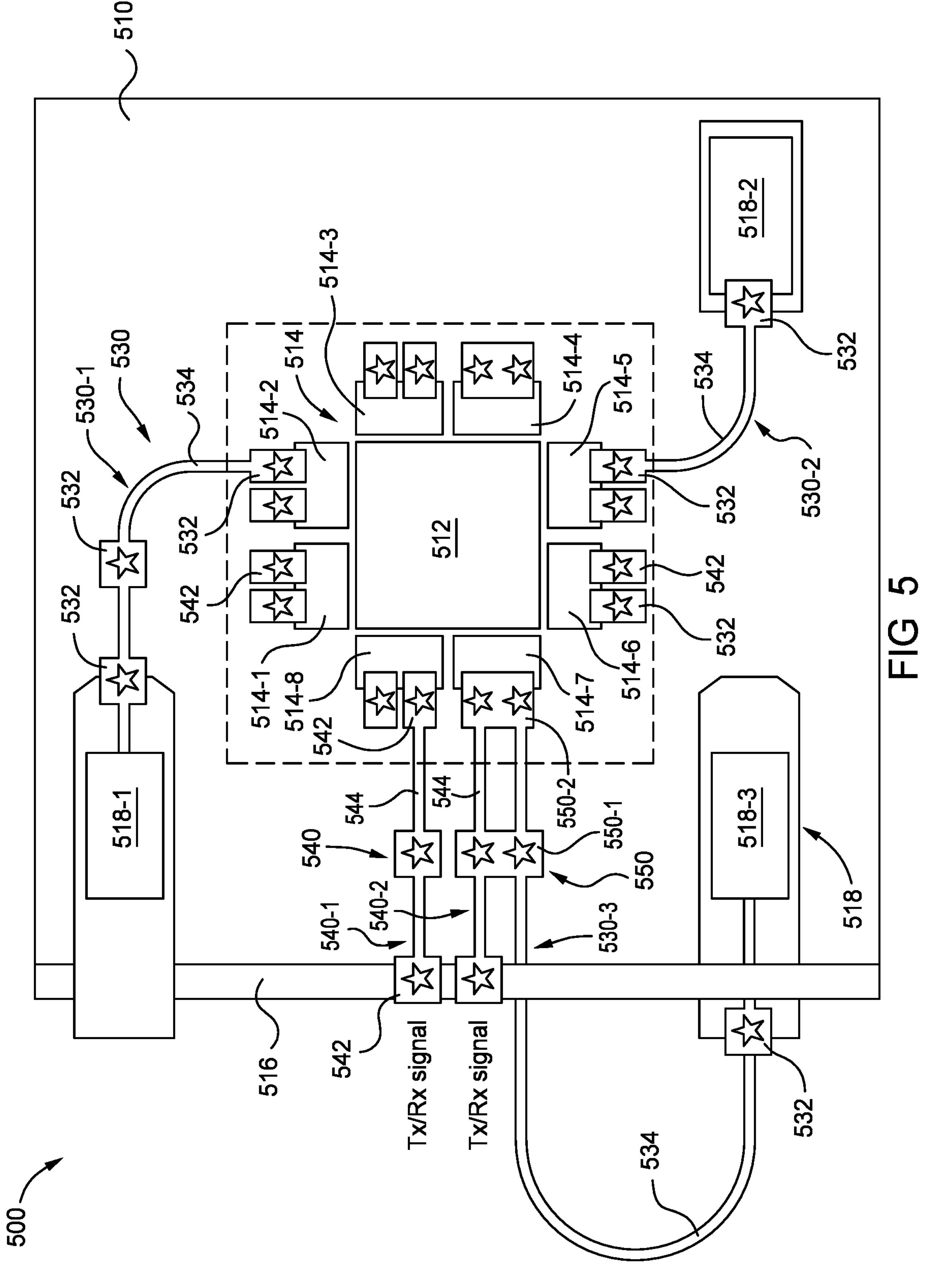
FIG. 5 is a schematic view of another opto-electronic apparatus according to one or more embodiments.

FIG. 5 is a schematic view of an opto-electronic apparatus 500 according to one or more embodiments. In FIG. 5, the opto-electronic apparatus 100 is configured as a CPO system. As shown, the opto-electronic apparatus 500 includes, among other components, a substrate 510, an electronic integrated circuit (IC) 512, optical engines 514-1 through 514-8 (generically or collectively, optical engine(s) 514), a faceplate 516, RLS 518-1, 518-2, 518-3 (generically or collectively, RLS 518). The substrate 510, electronic IC 512, and the optical engines 514 can function and be arranged in a similar manner as the substrate 110, the electronic IC 112, the optical engines 114, the faceplate 116, and the RLS 118, respectively, of the opto-electronic apparatus 100 of FIG. 1.

The opto-electronic apparatus 500 of FIG. 5 has at least one relatively high power optical channel along which relatively high power optical signals (e.g., optical signals from an RLS) can traverse as well as at least one relatively low power optical channel along which relatively low power optical signals (e.g., transmitted and/or received signals from devices, or Tx and/or Rx signals) can traverse. Specifically, for the depicted embodiment of FIG. 5, the opto-electronic apparatus 500 includes, among others that are possible, a first relatively high power optical channel 530-1, a second relatively high power optical channel 530-2, and a third relatively high power optical channel 530-3 (generically or collectively, relatively high power optical channel(s) 530). Such relatively high power optical channels 530 can span from their respective RLS 118 to their respective optical engines 514, for example. A combination of optical fibers and optical connectors can optically couple such elements. As shown in FIG. 5, optical connectors 532 (e.g., those with a focus on enhanced eye safety) and optical fibers 534 configured for relatively high power optics can be positioned along their respective relatively high power optical channels 530 to facilitate optical coupling of the relatively high power optical channels 530.

The opto-electronic apparatus 500 also includes, among others that are possible, a first relatively low power optical channel 540-1 and a second relatively low power optical channel 540-2 (generically or collectively, relatively low power optical channel(s) 540). As one example, such relatively low power optical channels 540 can span from a device connected to an optical connector at the faceplate 516 to their respective optical engines 514. A combination of optical fibers and optical connectors can optically couple such elements. As illustrated in FIG. 5, optical connectors 542 (e.g., those with a focus on minimizing insertion loss) and optical fibers 544 configured for relatively low power optics can be positioned along their respective relatively low power optical channels 540 to facilitate optical coupling of the relatively low power optical channels 540.

Moreover, as depicted in FIG. 5, the opto-electronic apparatus 500 can include one or more hybrid optical connectors. Such hybrid optical connectors can be arranged to meet the specific needs of at least two optical channels, such as a relatively high power optical channel and a relatively low optical channel. By way of example, in FIG. 5, the opto-electronic apparatus 500 includes a plurality of hybrid optical connectors 550, including, among others, a first hybrid optical connector 550-1 and a second hybrid optical connector 550-2. The first hybrid optical connector 550-1 is positioned along the third relatively high power optical channel 530-3 and the second relatively low power optical channel 540-2 at a mid-board position. The second hybrid optical connector 550-2 is positioned along the third relatively high power optical channel 530-3 and the second relatively low power optical channel 540-2 at an optical engine position. The hybrid optical connectors 550 can include a ferrule having a lens associated with each channel that are respectively configured to focus optical signals in purposeful manners to achieve an objective, e.g., enhanced eye safety, low insertion loss, etc. Such hybrid optical connectors 550 are uniquely arranged to handle the specific needs of the relatively high and low power optical channels 530, 540 whilst offering a compact design, which is beneficial for a multitude of reasons. Example hybrid optical connectors are presented below in FIGS. 6A and 6B.

Figure 6A:
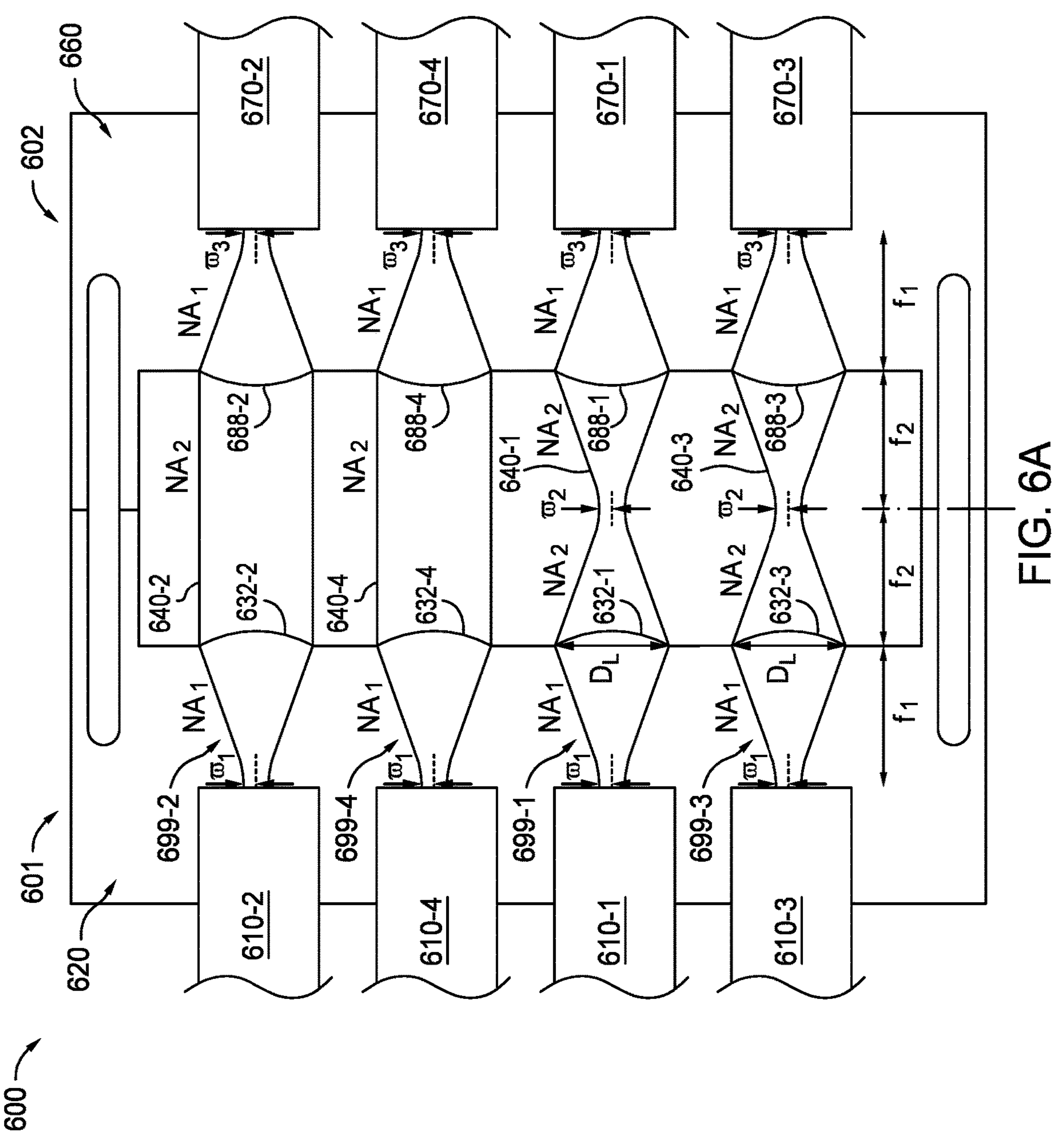
FIG. 6A is a schematic view of an optical system that includes a first optical connector mechanically and optically coupled with a second optical connector according to one or more embodiments.

FIG. 6A is a schematic view of an optical system 600 that includes a first optical connector 601 mechanically and optically coupled with a second optical connector 602. The first and second optical connectors 601, 602 are uniquely arranged to meet the needs of specific optical channels of the optical system 600. The first and second optical connectors 601, 602 can be incorporated into the opto-electronic apparatus 500 of FIG. 5, for example. For instance, the first and second optical connectors 601, 602 can be any one of the hybrid optical connectors 550.

As depicted in FIG. 6A, the first optical connector 601 includes a first ferrule 620 that is mated with a plurality of optical fibers, including a first optical fiber 610-1, a second optical fiber 610-2, a third optical fiber 610-3, and a fourth optical fiber 610-4. The first ferrule 620 has a plurality of lenses, including a first lens 632-1, a second lens 632-2, a third lens 632-3, and a fourth lens 632-4. The first lens 632-1 is spaced from, and aligned with, the first optical fiber 610-1. The second lens 632-2 is spaced from, and aligned with, the second optical fiber 610-2. The third lens 632-3 is spaced from, and aligned with, the third optical fiber 610-3. The fourth lens 632-4 is spaced from, and aligned with, the fourth optical fiber 610-4.

The second optical connector 602 is configured in a same manner as the first optical connector 601. Particularly, the second optical connector 602 includes a second ferrule 660 that is mated with a plurality of optical fibers, including a first optical fiber 670-1, a second optical fiber 670-2, a third optical fiber 670-3, and a fourth optical fiber 670-4. The second ferrule 660 has a plurality of lenses, including a first lens 688-1, a second lens 688-2, a third lens 688-3, and a fourth lens 688-4. The first lens 688-1 is spaced from, and aligned with, the first optical fiber 670-1. The second lens 688-2 is spaced from, and aligned with, the second optical fiber 670-2. The third lens 688-3 is spaced from, and aligned with, the third optical fiber 670-3. The fourth lens 688-4 is spaced from, and aligned with, the fourth optical fiber 670-4.

In the depicted embodiment of FIG. 6A, for the first optical connector 601, the first optical fiber 610-1 aligned with the first lens 632-1 is a PMF, the second optical fiber 610-2 aligned with the second lens 632-2 is a SMF, the third optical fiber 610-3 aligned with the third lens 632-3 is a PMF, and the fourth optical fiber 610-4 aligned with the fourth lens 632-4 is a SMF. Similarly, for the second optical connector 602, the first optical fiber 670-1 aligned with the first lens 688-1 is a PMF, the second optical fiber 670-2 aligned with the second lens 688-2 is a SMF, the third optical fiber 670-3 aligned with the third lens 688-3 is a PMF, and the fourth optical fiber 670-4 aligned with the fourth lens 688-4 is a SMF.

Optical signals can traverse between respective sets of optical fibers by way of optical coupling of the first optical connector 601 with the second optical connector 602. Specifically, a first optical signal 640-1 can traverse between the first optical fiber 610-1 and the first optical fiber 670-1, a second optical signal 640-2 can traverse between the second optical fiber 610-2 and the second optical fiber 670-2, a third optical signal 640-3 can traverse between the third optical fiber 610-3 and the third optical fiber 670-3, and a fourth optical signal 640-4 can traverse between the fourth optical fiber 610-4 and the fourth optical fiber 670-4.

The mating of the first optical connector 601 with the second optical connector 602 as depicted in FIG. 6A enables optical coupling of at least one relatively high power optical channel along which relatively high power optical signals (e.g., optical signals from an RLS) can traverse as well as optical coupling of at least one relatively low power optical channel along which relatively low power optical signals (e.g., transmitted and/or received signals from devices, or Tx and/or Rx signals) can traverse. For the depicted embodiment of FIG. 6A, for example, the optical system 600 includes a first optical channel 699-1, a second optical channel 699-2, a third optical channel 699-3, and a fourth optical channel 699-4. The first and third optical channels 699-1, 699-3 are relatively high power optical channels while the second and fourth optical channels 699-2, 699-4 are relatively low power optical channels. In this regard, relatively high power optical signals, such as the first optical signal 640-1, can traverse along the first optical channel 699-1. Likewise, relatively high power optical signals, such as the third optical signal 640-3, can traverse along the second optical channel 699-2. Moreover, relatively low power optical signals, such as the second optical signal 640-2, can traverse along the second optical channel 699-2. Similarly, relatively low power optical signals, such as the fourth optical signal 640-4, can traverse along the fourth optical channel 699-4. Accordingly, the first and third optical channels 699-1, 699-3 can be rated for a first power level and the second and fourth optical channels 699-2, 699-4 can be rated for a second power level, with the first power level being greater than the second power level. In alternative embodiments, the first, second, third, and fourth optical channels 699-1, 699-2, 699-3, 699-4 can be rated for different power levels.

For the relatively low power optical channels, e.g., the second and fourth optical channels 699-2, 699-4, the lenses are arranged so that the relatively low power optical signals traversing from one connector to the other are collimated, which may provide enhanced lateral tolerance resilience. Particularly, as shown in FIG. 6A, the second lens 632-2 is configured to focus the second optical signal 640-2 received from the second optical fiber 610-2 to collimate. Consequently, for the second optical signal 640-2, the second numerical aperture $NA_2$ is relatively small. Similarly, the fourth lens 632-4 is configured to focus the fourth optical signal 640-4 received from the fourth optical fiber 610-4 to collimate. As a result, like the second optical signal 640-2, the second numerical aperture $NA_2$ associated with the fourth optical signal 640-4 is relatively small.

For the relatively high power optical channels, e.g., the first and third optical channels 699-1, 699-3, the lenses are arranged so that the relatively high power optical signals traversing from one connector to the other are focused to converge a beam waist so as to diverge thereafter, providing enhanced eye safety, which may be particularly useful for relatively high power applications, such as handling optical signals from a RLS. Specifically, as shown in FIG. 6A, the first lens 632-1 is configured to focus the first optical signal 640-1 received from the first optical fiber 610-1 to converge to a second beam waist $\omega_2$ before diverging thereafter. Consequently, for the first optical signal 640-1, the second numerical aperture $NA_2$ is relatively large, e.g., compared to the second numerical aperture $NA_2$ associated with the second or fourth optical signals 640-2, 640-4 depicted in FIG. 6A. Similarly, the third lens 632-3 is configured to focus the third optical signal 640-3 received from the third optical fiber 610-3 to converge to a second beam waist $\omega_2$ before diverging thereafter. As a result, like the first optical signal 640-1, the second numerical aperture $NA_2$ associated with the third optical signal 640-3 is relatively large. Notably, in FIG. 6A, the first and third optical signals 640-1, 640-3 each have hourglass shapes as they traverse through an interior volume defined by the coupled first and second optical connectors 601, 602. The hourglass shapes of the first and third optical signals 640-1, 640-3 are distinguishable with respect to the shapes of the collimated second and fourth optical signals 640-2, 640-4 traversing through the interior volume.

Further, for the depicted embodiment of FIG. 6A, to achieve the converging-diverging optical signals for the relatively high power optical channels, e.g., for enhanced high safety, and the collimated optical signals for the relatively low power optical channels, e.g., for enhanced lateral tolerance resilience and consequently lower insertion losses, the lenses associated with the relatively high power optical channels can have different curvature than lenses associated with the relatively low power optical channels. For instance, for the first optical connector 601, the first lens 632-1 (associated with a relatively high power optical channel) has a different radius of curvature than the second lens 632-2 (associated with a relatively low power optical channel). Based at least in part on its radius of curvature, the first lens 632-1 is configured to focus the first optical signal 640-1 received from the first optical fiber 610-1 aligned with the first lens 632-1 to converge to the second beam waist $\omega_2$ before diverging thereafter. In contrast, based at least in part on its radius of curvature, the second lens 632-2 is configured to focus the second optical signal 640-2 received from the second optical fiber 610-2 aligned with the second lens 632-2 to collimate. A radius of curvature of the third lens 632-3 can be equal to the radius of curvature of the first lens 632-1 and a radius of curvature of the fourth lens 632-4 can be equal to the radius of curvature of the second lens 632-2. In this regard, the third lens 632-3 can have a different radius of curvature than the fourth lens 632-4. The lenses 688-1, 688-2, 688-3, 688-4 of the second optical connector 602 can be configured in a same or similar manner as their respective counterparts of the first optical connector 601.

In alternative embodiments, the first, second, third, and fourth lenses 632-1, 632-2, 632-3, 632-4 can have different curvature but yet still focus their respective optical signals in the converging-diverging and collimated manners, e.g., as depicted in FIG. 6A. In yet other alternative embodiments, the optical system 600 can have more or less optical channels than shown in FIG. 6A, but yet having at least one relatively low power optical channel and at least one relatively high power optical channel.

Advantageously, the example embodiment of FIG. 6A provides optical connectors uniquely arranged to meet the specific needs of at least two optical channels of a system, e.g., an optical channel with a focus minimizing insertion loss and an optical channel with a focus on eye safety.

Figure 6B:
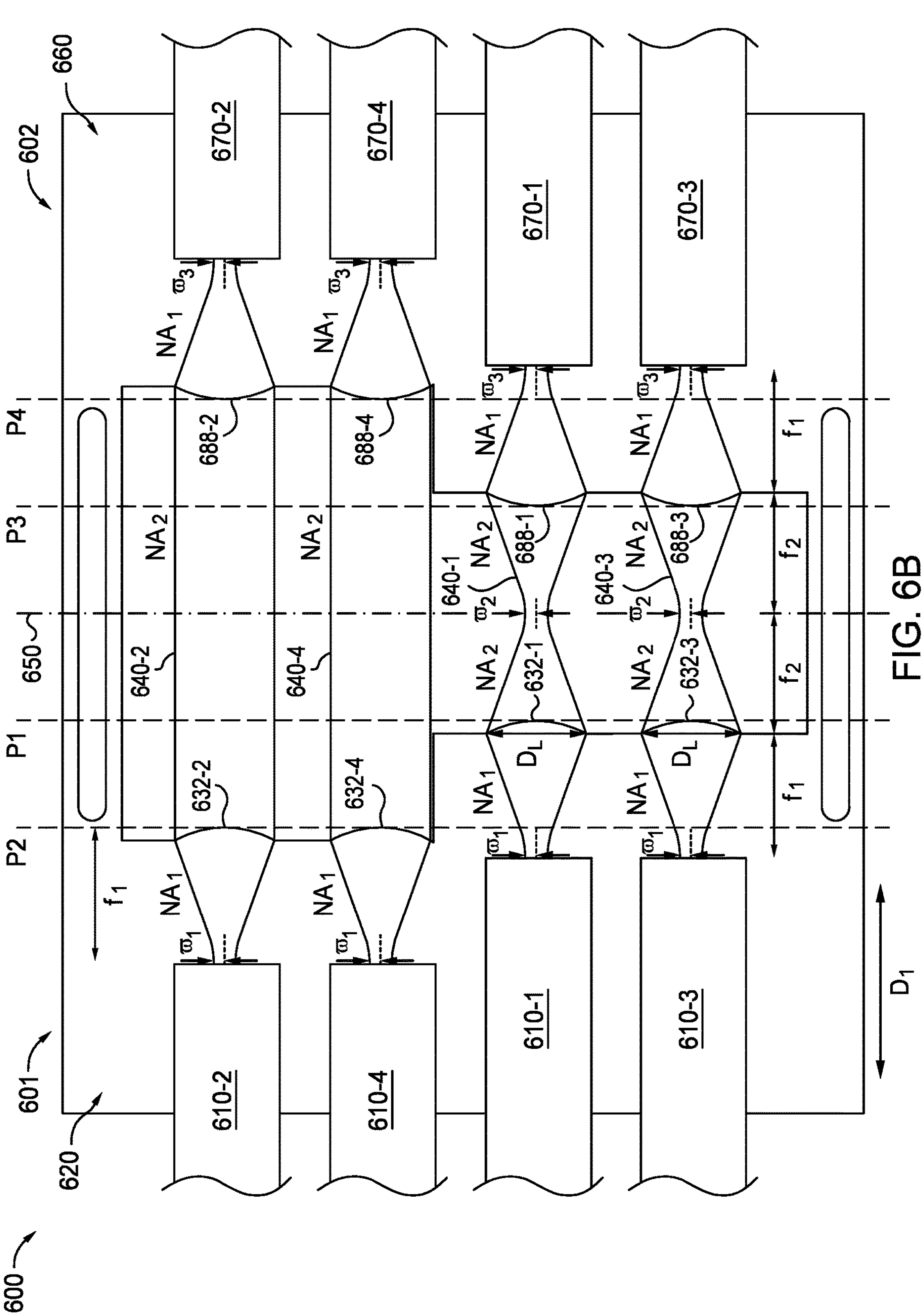
FIG. 6B is a schematic view of an alternative embodiment of the optical system of FIG. 6A.

FIG. 6B is a schematic view of one alternative embodiment of the optical system 600 of FIG. 6A. In some embodiments, at least one lens of an optical connector can be arranged in a plane offset from a plane in which another lens is arranged. For instance, in FIG. 6B, the first lens 632-1 and the third lens 632-3 are arranged in a first plane P1 while the second lens 632-2 and the fourth lens 632-4 are arranged in a second plane P2. Specifically, the apexes of the first and third lenses 632-1, 632-3 are arranged in the first plane P1 while the apexes of the second and fourth lenses 632-2, 632-4 are arranged in the second plane P2. The first plane P1 is offset from the second plane P2, e.g., in a first direction D1 corresponding to a direction of optical signal traversal through the optical system 600. In this way, for the first optical connector 601, the lenses associated with the relatively high power optical channels are arranged in a different plane than the lenses associated with the relatively low power optical channels. Accordingly, the collimated optical signals propagating along their respective relatively low power optical channels can be arranged to traverse a longer or shorter distance through the interior volume of the optical system 600 than the converging-diverging optical signals.

The same can be true for the second optical connector 602. As shown in FIG. 6B, the first lens 688-1 and the third lens 688-3 are arranged in a third plane P3 while the second lens 688-2 and the fourth lens 688-4 are arranged in a fourth plane P4. Specifically, the apexes of the first and third lenses 688-1, 688-3 are arranged in the third plane P3 while the apexes of the second and fourth lenses 688-2, 688-4 are arranged in the fourth plane P4. The third plane P3 is offset from the fourth plane P4, e.g., in the first direction D1.

In some embodiments, the second plane P2 can be arranged or positioned further away from a central plane 650 than the second plane P1, e.g., as shown in FIG. 6B. The central plane 650 is defined along a centerline between the first and second optical connectors 601, 602. In other embodiments, the second plane P2 can be arranged or positioned closer to the central plane 650 than the second plane P1. In addition, the fourth plane P4 can be arranged or positioned further away from the central plane 650 than the third plane P3, e.g., as shown in FIG. 6B. In other embodiments, the fourth plane P4 can be arranged or positioned closer to the central plane 650 than the third plane P3. Advantageously, having the fiber facets in different planes may be beneficial to assembly of an optical connector, e.g., allowing for camera vision from the side on multiple fibers. As one example, for a 2D optical connector, the vertical levels of the optical fibers thereof may benefit from the offset fiber facets, such as for fiber insertion or vision assist when looking top down during assembly.

In some embodiments, despite the lenses being offset from one another in different planes, the lenses associated with the relatively high power optical channels can be spaced from their respective optical fibers a same focal distance as the lenses associated with the relatively low power optical channels are spaced from their respective optical fibers. By way of example, for the first optical connector 601, the first lens 632-1 is spaced a first focal distance $f_1$ from the first optical fiber 610-1 aligned therewith. Likewise, the second lens 632-2 is spaced a first focal distance $f_1$ (see above the second optical fiber 610-2) from the second optical fiber 610-2 aligned therewith. The first focal distance $f_1$ associated with the first lens 632-1 is the same distance as the first focal distance $f_1$ associated with the second lens 632-2. Arranging the first ferrule 620 so that the first focal distance $f_1$ associated with the first lens 632-1 is the same distance as the first focal distance $f_1$ associated with the second lens 632-2 can advantageously allow for beam diameters of optical signals 640-1, 640-2 propagating through their respective lenses 632-1, 632-2 to be the same.

Figure 7:
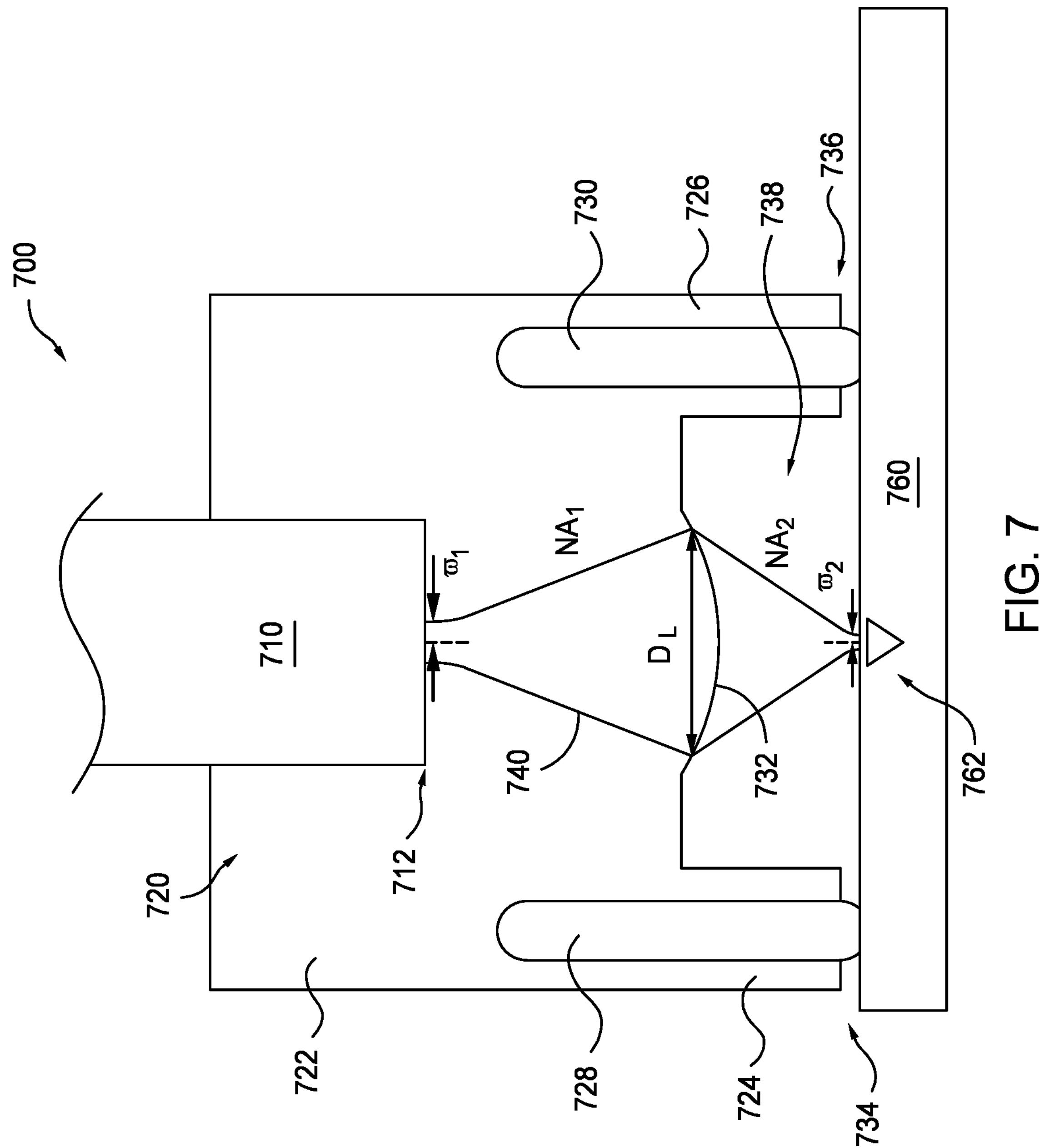
FIG. 7 is a schematic view of an optical system that includes a first optical connector mechanically and optically coupled with a photonics integrated circuit according to one or more embodiments.

FIG. 7 is a schematic view of an optical system 700 that includes an optical connector 701 coupled with a PIC 760 according to one or more embodiments.

As shown in FIG. 7, the optical connector 701 includes an optical fiber 710 and a ferrule 720 mated with the optical fiber 710. The optical fiber 710 can be a SMF or a PMF, for example. The ferrule 720 can be formed of a transparent or semi-transparent material, e.g., to allow optical signals to traverse therethrough. The ferrule 720 has a body 722 and a pair of opposing guide prongs 724, 726 extending from the body 722. The guide prongs 724, 726 each receive respective guide pins 728, 730. For instance, the optical connector 701 can define respective blind openings or slots that receive the guide pins 728, 730 held or supported by the PIC 760 or a structure associated with the PIC 760. Alternatively, the guide pins 728, 730 can be held or supported by the optical connector 701 and received by blind openings or slots defined by the PIC 760 or the structure associated with the PIC 760. In addition, the ferrule 720 has a lens 732 spaced from an end 712 of the optical fiber 710. The lens 732 is recessed relative to ends 734, 736 of the guide prongs 724, 726. The lens 732 and the body 722 of the ferrule 720 define a volume 738, e.g., through which optical signals traverse.

An optical signal 740 propagating from the optical fiber 710 has a first beam waist $\omega_1$ at or immediately adjacent the optical fiber 710. Due to the spacing between the lens 732 and the end 712 of the optical fiber 710, the optical signal 740 diverges as it propagates from the first beam waist $\omega_1$ to the lens 732. In this regard, the ferrule 720 is arranged so that the optical signal 740 propagating from the optical fiber 710 diverges prior to passing through the lens 732. In diverging from the optical fiber 710 to the lens 732, the optical signal 740 has a first numerical aperture $NA_1$.

Notably, the lens 732 is configured to focus the optical signal 740 received from the optical fiber 710 to converge to a beam waist, e.g., a second beam waist $\omega_2$, at or immediately adjacent an optical coupler 762 of the PIC 760, e.g., as shown in FIG. 7. In converging from the lens 732 to the optical coupler 762, the optical signal 740 has a second numerical aperture $NA_2$. As depicted in FIG. 7, the optical signal 740 has half of an hourglass shape (as outlined by the NA of the optical signal 740) as it traverses through the volume 738.

In some embodiments, the first beam waist $\omega_1$ is greater than the second beam waist $\omega_2$, e.g., as in the depicted embodiment of FIG. 7, which can provide enhanced eye safety. In some embodiments, the first beam waist $\omega_1$ is equal to the second beam waist $\omega_2$, which can strike a balance between eye safety and sensitivity to lateral offsets.

In yet other embodiments, to achieve a lower insertion loss penalty, the second beam waist $\omega_2$ is greater than the first beam waist $\omega_1$ and less than a beam diameter $D_L$ of the optical signal 740 at the lens 732. In some particular embodiments, the optical connector 701 is arranged so that the beam diameter $D_L$ of the optical signal 740 at the lens 732 is greater than the second beam waist $\omega_2$, and so that the second beam waist $\omega_2$ is greater than the first beam waist $\omega_1$ but equal to or less than four times the first beam waist $\omega_1$, or stated mathematically, so that so that $D_L>\omega_2$ and $\omega_1<\omega_2\leq 4*\omega_1$. In yet other particular embodiments, the optical connector 701 is arranged so that the beam diameter $D_L$ of the optical signal 740 at the lens 732 is greater than the second beam waist $\omega_2$, and so that the second beam waist $\omega_2$ is greater than the first beam waist $\omega_1$ but equal to or less than two times the first beam waist $\omega_1$, or stated mathematically, so that so that $D_L>\omega_2$ and $\omega_1<\omega_2\leq 2*\omega_1$. In some further particular embodiments, the optical connector 701 is arranged so that the beam diameter $D_L$ of the optical signal 740 at the lens 732 is greater than the second beam waist $\omega_2$, and so that the second beam waist $\omega_2$ is between two and four times the first beam waist $\omega_1$, including the end points, or stated mathematically, so that so that $D_L>\omega_2$ and $\omega_2$ is between $2*\omega_1$ and $4*\omega_1$, including the end points. In yet further particular embodiments, the optical connector 701 is arranged so that a beam radius of the optical signal 740 at the second beam waist $\omega_2$ is five to ten times smaller than the beam diameter $D_L$ of the optical signal 740 at the lens 732.

Further, the optical coupler 762 can be a grating coupler or a spot size converter, for example. In some embodiments, the optical fiber 710 has a Mode Field Diameter (MFD) and the optical coupler 762 (e.g., a grating coupler) has an MFD. In such embodiments, the MFD of the optical fiber 710 and MFD of the optical coupler 762 can differ from one another. As one example, the MFD of the optical coupler 762 can be larger than the MFD of the optical fiber 710. As another one example, the MFD of the optical coupler 762 can be smaller than the MFD of the optical fiber 710.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

What is claimed is:

1. An optical connector, comprising:

an optical fiber; and a ferrule mated with the optical fiber and having a lens spaced from an end of the optical fiber, the lens is configured to focus an optical signal received from the optical fiber to converge to a second beam waist before diverging thereafter, wherein the optical signal has a first beam waist at or immediately adjacent to the optical fiber, and wherein a diameter of the second beam waist is less than a beam diameter of the optical signal at the lens and is less than a diameter of the first beam waist.

2. The optical connector of claim 1, wherein the second beam waist is between two and four times the first beam waist.

3. The optical connector of claim 1, wherein a beam radius of the optical signal at the second beam waist is five to ten times smaller than a beam diameter of the optical signal at or adjacent the lens.

4. The optical connector of claim 1, wherein the lens is configured to focus the optical signal to the second beam waist before the optical signal is received by a different optical connector or a photonics integrated circuit.

5. The optical connector of claim 1, wherein the ferrule has a body and a pair of guide prongs that each receive a guide pin, the lens is recessed relative to ends of the guide prongs, the lens and the body define a volume through which the optical signal traverses.

6. The optical connector of claim 5, wherein the second beam waist to which the optical signal converges and then diverges thereafter is aligned in a same plane as the ends of the guide prongs.

7. An optical connector, comprising:

a ferrule having a first lens and a second lens, the first lens is spaced from, and aligned with, a first optical fiber mated with the ferrule and the second lens is spaced from, and aligned with, a second optical fiber mated with the ferrule, the first lens has a different radius of curvature than the second lens, wherein the first lens is configured to focus a first optical signal received from the first optical fiber to converge to a beam waist before diverging thereafter, the second lens is configured to focus a second optical signal received from the second optical fiber to collimate.

8. The optical connector of claim 7, wherein the first lens is associated with a relatively high power optical channel and the second lens is associated with a relatively low power optical channel.

9. The optical connector of claim 7, wherein the ferrule has a body and a pair of guide prongs that each receive a guide pin, the first lens and the second lens are recessed relative to ends of the guide prongs, and wherein the beam waist to which the first optical signal converges and then diverges thereafter is aligned in a same plane as the ends of the guide prongs and the second optical signal is collimated at the same plane.

10. The optical connector of claim 7, wherein the ferrule has a third lens and is mated with a third optical fiber spaced from, and aligned with, the third lens, the ferrule also has a fourth lens and is mated with a fourth optical fiber spaced from, and aligned with, the fourth lens, the third lens having a different radius of curvature than the fourth lens.

11. The optical connector of claim 10, wherein the third lens has a third radius of curvature and the fourth lens has a fourth radius of curvature, and wherein the third radius of curvature is equal to a radius of curvature of the first lens and the fourth radius of curvature is equal to a radius of curvature of the second lens.

12. The optical connector of claim 7, wherein the first lens is arranged in a first plane and the second lens is arranged in a second plane, the first plane being offset from the second plane along a direction of optical signal traversal.

13. The optical connector of claim 12, wherein the first lens is spaced a first distance from the first optical fiber aligned therewith and the second lens is spaced a second distance from the second optical fiber aligned therewith, the first distance being equal to or substantially equal to the second distance.

14. An optical system, comprising:

an optical connector having an optical fiber and a ferrule mated with the optical fiber, the ferrule having a lens spaced from an end of the optical fiber, the lens is configured to focus an optical signal received from the optical fiber to converge to a second beam waist, the optical signal has a first beam waist at or immediately adjacent to the optical fiber, and wherein a diameter of the second beam waist is less than a beam diameter of the optical signal at the lens and is less than a diameter of the first beam waist.

15. The optical system of claim 14, wherein the optical signal diverges after converging to the second beam waist, and wherein the optical signal further comprises:

a second optical connector removably coupled with the optical connector, the second optical connector having a second optical fiber and a second ferrule mated with the second optical fiber, the second ferrule having a second lens spaced from an end of the second optical fiber, the second lens is configured to focus the optical signal, which has diverged after the second beam waist, to converge to a third beam waist prior to being received by the second optical fiber.

16. The optical system of claim 14, further comprising:

a photonics integrated circuit having an optical coupler, and wherein the ferrule is removably coupled with the photonics integrated circuit, and wherein the lens is configured to focus the optical signal from the optical fiber to converge to the second beam waist at or immediately adjacent the optical coupler.

* * * * *